US008264373B2

(12) United States Patent
Hägg

(10) Patent No.: US 8,264,373 B2
(45) Date of Patent: Sep. 11, 2012

(54) GAUGING SYSTEM HAVING WIRELESS CAPABILITY

(75) Inventor: Lennart Hägg, Kungsbacka (SE)

(73) Assignee: Rosemount Tank Radar AB, Gothenburg (SE)

( * ) Notice: Subject to any disclaimer, the term of this patent is extended or adjusted under 35 U.S.C. 154(b) by 1258 days.

(21) Appl. No.: 11/969,345

(22) Filed: Jan. 4, 2008

(65) Prior Publication Data

US 2009/0174570 A1 Jul. 9, 2009

(51) Int. Cl.
*G01C 19/22* (2006.01)
*H04Q 9/00* (2006.01)

(52) U.S. Cl. ................ 340/870.07; 340/508; 340/539.1; 340/693.1

(58) Field of Classification Search .............. 340/870.07
See application file for complete search history.

(56) References Cited

U.S. PATENT DOCUMENTS

| | | | | |
|---|---|---|---|---|
| 5,682,476 | A | 10/1997 | Tapperson et al. | 395/200.05 |
| 5,793,963 | A | 8/1998 | Tapperson et al. | 395/200.31 |
| 6,014,100 | A | 1/2000 | Fehrenbach et al. | 342/124 |
| 7,262,693 | B2 * | 8/2007 | Karschnia et al. | 340/508 |
| 7,328,726 | B2 * | 2/2008 | Cohen et al. | 141/9 |
| 7,372,397 | B2 * | 5/2008 | Nilsson | 342/124 |
| 7,560,907 | B2 * | 7/2009 | Nelson | 322/37 |
| 7,773,715 | B2 * | 8/2010 | Westfield et al. | 375/377 |
| 2002/0065631 | A1 | 5/2002 | Loechner | 702/188 |
| 2003/0052657 | A1 | 3/2003 | Koernle et al. | 323/282 |
| 2004/0061537 | A1 | 4/2004 | Flasza | 327/157 |
| 2005/0289276 | A1 | 12/2005 | Karschnia et al. | 710/305 |
| 2006/0148410 | A1 | 7/2006 | Nelson et al. | 455/67.11 |
| 2006/0256534 | A1 * | 11/2006 | Garnett et al. | 361/730 |
| 2006/0291438 | A1 | 12/2006 | Karschnia et al. | 370/338 |
| 2007/0021140 | A1 * | 1/2007 | Keyes et al. | 455/522 |

OTHER PUBLICATIONS

International Search Report for PCT/SE2008/051570, dated Apr. 14, 2009.

* cited by examiner

*Primary Examiner* — Rexford Barnie
*Assistant Examiner* — Toan Vu
(74) *Attorney, Agent, or Firm* — Westman, Champlin & Kelly, P.A.

(57) ABSTRACT

The present invention relates to a gauging system, comprising a gauge configured to sense a process variable and to provide process data representative of the process variable, a processing unit connected to the gauge, the processing unit comprising power supply circuitry configured to receive power from a remote external power source and to provide regulated power, and first circuitry configured to receive process data from the gauge and to superimpose the process data onto the regulated power forming a power signal, and a wireless communication unit electrically connected to the processing unit by means of a two-wire control loop, the wireless communication unit comprising second circuitry configured to receive the power signal and to separate the process data from the regulated power, an antenna, and radio frequency (RF) communication circuitry being powered by means of the regulated power from the second circuitry, configured to receive process data from the second circuitry, and to transmit RF signals representative of the process data using the antenna, wherein the power signal is capable of delivering enough regulated power to the wireless communication unit for allowing transmission of RF signals at any given moment.

27 Claims, 4 Drawing Sheets

GAUGING SYSTEM HAVING WIRELESS CAPABILITY

TECHNICAL FIELD OF THE INVENTION

The present invention relates to a gauging system having wireless capability.

TECHNICAL BACKGROUND

Systems for measuring properties of products contained in tanks or vessels—so-called tank gauging systems—are ubiquitous in application areas involving handling, shipping and storing of products as well as, for example, in the chemical process industry.

Since products to be monitored and/or measured are often hazardous, special safety requirements exist for equipment, such as tank gauging systems or at least parts thereof that are positioned within a so-called hazardous area. Therefore, such equipment generally needs to be certified as either explosion-proof or intrinsically safe. For intrinsically safe equipment, there are limitations to ensure that the equipment is unable to cause ignition of a gas, which may be present in the hazardous area.

A representative area of application of tank gauging systems is in a storage facility for petroleum products and the like, often referred to as a "tank farm". In such a tank farm, each tank is typically equipped with a number of sensing units, each configured to sense a certain property, such as level, temperature, pressure, etc of the product contained in that tank.

Traditional intrinsically safe systems for hazardous environments are mainly analog so-called 4-20 mA systems, in which sensing units are connected in a point-to-point fashion to a central host via intrinsically safe barriers in order to provide intrinsic safety within the hazardous area.

It is easily understood that traditional 4-20 mA systems require a great deal of wiring. Especially for an application such as a tank farm in which the tanks can be separated by considerable distances, the wiring, together with the large number of intrinsically safe barriers needed, stands for a substantial portion of the cost of installing the tank gauging system.

One method of reducing the amount of wiring in an intrinsically safe system is to use a digital intrinsically safe communication bus. Using such a bus, various sensors may be connected along the bus, and it is sufficient to route one cable from a number of sensors to a control room. An example of such a digital communication bus is the HART-bus where up to 15 sensors can be connected on one bus segment. Another method of reducing the amount of wiring in an intrinsically safe system is to use wireless technologies for communicating with the sensing units. For example, completely wireless installations are used in which the field device uses a battery, solar cell, or other technique to obtain power without any sort of wired connection.

Another example is provided through U.S. Pat. No. 7,262,693, disclosing a combination of wired and wireless communication with a sensing unit. In this example, an intrinsically safe control loop carries data and provides power to a wireless field device connected in series with the sensing unit, and RF circuitry in the wireless field device is powered using power received from the intrinsically safe two-wire process control loop. The wireless field device is further adapted to limits its influence on the two-wire process control loop.

However, the wireless field device in some cases provides limited possibilities to wirelessly transmit and receive information, as the intrinsically safe two-wire process control loop is strictly restricted in the sense of how much power that can be provided to the wireless field device without severely influencing information communicated over the two-wire process control loop.

There is thus a need for an improved gauging system having wireless capabilities.

OBJECTS OF THE INVENTION

In view of the above-mentioned and other drawbacks of the prior art, a general object of the present invention is to provide an improved gauging system having wireless capabilities An object of the present invention is to increase the possibilities to wirelessly transmit and receive information in a gauging system.

SUMMARY OF THE INVENTION

According to a first aspect of the invention, these and other objects are achieved through a gauging system, comprising a gauge configured to sense a process variable and to provide process data representative of the process variable, a processing unit connected to the gauge, the processing unit comprising power supply circuitry configured to receive power from a remote external power source and to provide regulated power, and first circuitry configured to receive process data from the gauge and to superimpose the process data onto the regulated power forming a power signal, and a wireless communication unit electrically connected to the processing unit by means of a two-wire control loop, the wireless communication unit comprising second circuitry configured to receive the power signal and to separate the process data from the regulated power, an antenna, and radio frequency (RF) communication circuitry being powered by means of the regulated power from the second circuitry, configured to receive process data from the second circuitry, and to transmit RF signals representative of the process data using the antenna, wherein the power signal is capable of delivering enough regulated power to the wireless communication unit for allowing transmission of RF signals at any given moment.

The present invention is based upon the realization that it is possible to derive a positive effect from the fact that a remote external power source is used in conjunction with the gauging system. Through the configuration according to the invention, by having a constant remote power source available, the wireless communication unit may be activated at any given moment. Activation at any moment allows theoretically for continuous wireless communication. However, in practice continuous wireless communication may not be possible, as the wireless bandwidth is divided amongst different wireless devices arranged to communicate at the same or of a close frequency at which the RF circuitry in the wireless communication unit is configured to communicate. In any case, through the power supply configuration according to the invention, a sufficient amount of power may be supplied for continuous powering of the gauge and the processing unit, at the same time as the wireless communication unit is allowed to be activated at any given moment.

The process data representative of the process variable sensed by the gauge, and similarly the information received by the RF circuitry to be provided to the processing unit, may be transferred to and received from an external control system, e.g. a control system associated with an operational control room. Through this configuration, intelligent gauging systems may be provided, which are able to provide to the external control system not only raw data, but measurement data which has been processed in various ways by means of for example the processing unit. An example of a suitable wireless communication unit for use in the gauging system according to the invention is disclosed in U.S. Pat. No. 7,262, 693 which is hereby fully incorporated by reference.

Such processing may include aggregation of measurement data obtained from a gauge, to, for example, facilitate statistical analysis, and combination of measurement data from two or more gauges. The processing may result in data indicative of parameters, such as a level, a volume, a density or combinations thereof. Also, separate wiring for communication of process data may thus be avoided, and the need for explosion-proof barriers around microwave-based level gauges may be alleviated. Installation and procurement costs may thereby be considerably reduced. That is, the gauge is not limited to any specific type of measurement device.

However, in an embodiment, the gauge is a microwave-based level gauge configured to sense a level of a product in a tank through reflection of microwave energy The microwave-based level gauge may be adapted to emit continuous signals, and the microwave-based level gauge may comprise processing circuitry adapted to determine the tank level based on a phase difference between a received echo signal and a reference signal. The microwave-based level gauge is generally capable of very accurate level measurements while requiring relatively much power compared to other types of sensing units, e.g. a need for a remote external power source. The microwave-based level gauge may be configured in accordance with an FMCW (Frequency Modulated Continuous Wave) or a TDR (Time Domain Reflectometry) configuration. However, other measurement procedures than FMCW and TDR may be used.

The gauging system according to the invention may also comprise further gauges. For example, a microwave-based level gauge and a temperature gauge may be connected to the same processing unit for transmitting and receiving information to and from a single wireless communication unit.

According to a second aspect of the invention, there is provided a method for providing power to a wireless communication unit electrically connected to a processing unit by means of a two-wire control loop, wherein the method comprises receiving a sensed process variable from a gauge connected to the processing unit, thereby forming process data representative of the process variable, providing regulated power based on power received from a remote external power source, superimposing the process data onto the regulated power, thereby forming a power signal, providing the power signal to the wireless communication unit, separating the process data from the regulated power, providing the regulated power to radio frequency (RF) communication circuitry comprised in the wireless communication unit, providing the separated process data to the RF communication circuitry, and transmitting RF signals representative of the process data by means of an antenna connected to the RF circuitry, wherein the power signal is capable of delivering enough regulated power to the wireless communication unit for allowing transmission of the RF signals at any given moment.

Further effects analogous to those described above in connection with the first aspect of the invention are also obtained through this second aspect of the present invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

Figure 1:
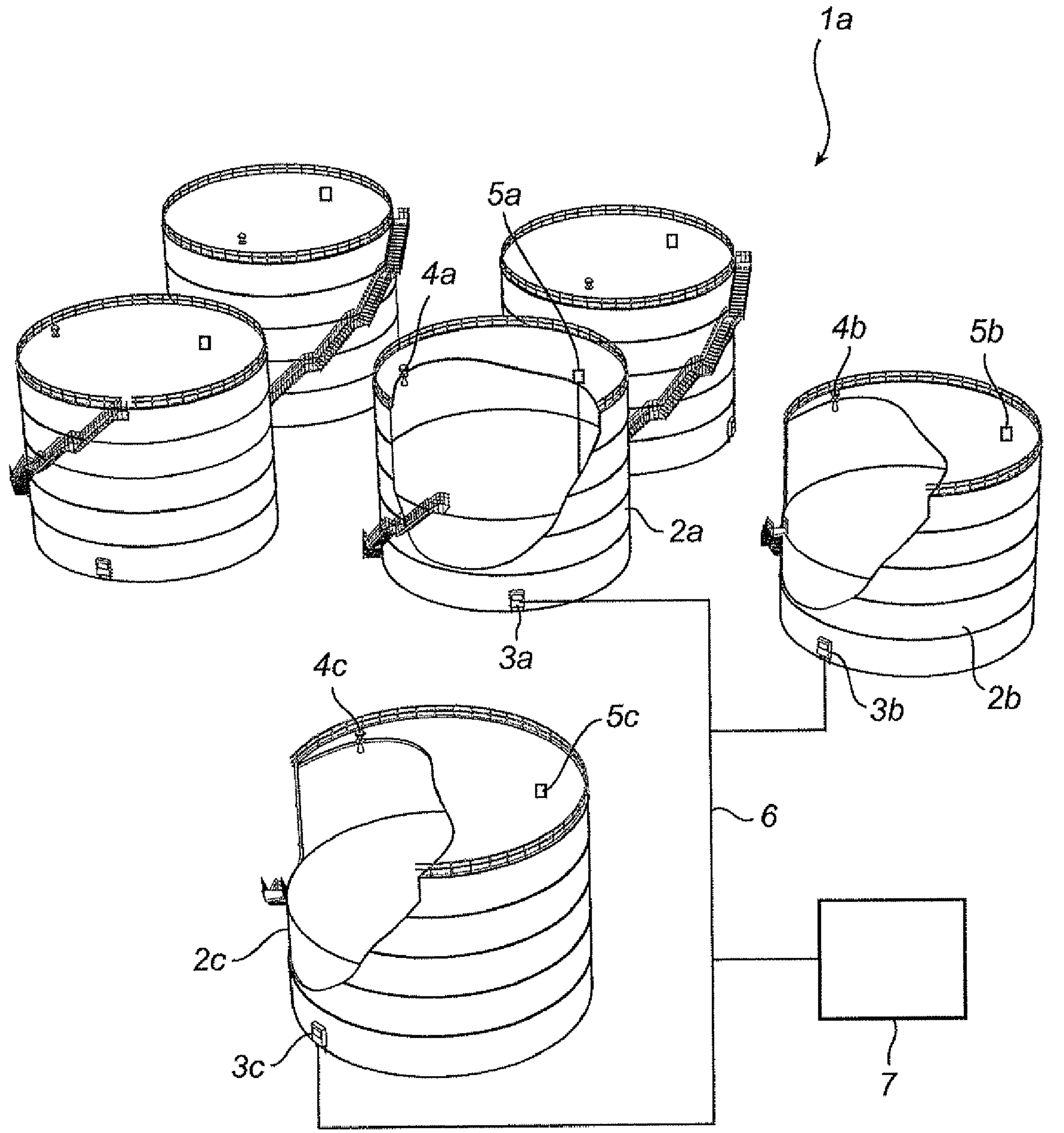
FIG. 1 is a schematic block diagram of a prior art tank farm where a plurality of gauging systems are wired together.

In the present description, embodiments of the present invention are mainly described with reference to a radar level gauge system being mounted on a container containing a product. However, it should be noted that this by no means limits the scope of the invention, which may be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

FIG. 1 shows a tank farm 1*a* as an example of a prior art tank farm where a plurality of gauging systems are wired together. In FIG. 1, by way of example, three tanks 2*a-c* are each shown to be equipped with a tank gauging system, including a controller, here shown as a separate control unit 3*a-c*, a microwave-based level gauge 4*a-c* and a temperature sensing unit 5*a-c*. The tank gauging systems are, via an external system bus 6, connected to a host computer 7, which is configured to control the levels and other parameters of the products contained in the tanks 2*a-c*.

Figure 2A:
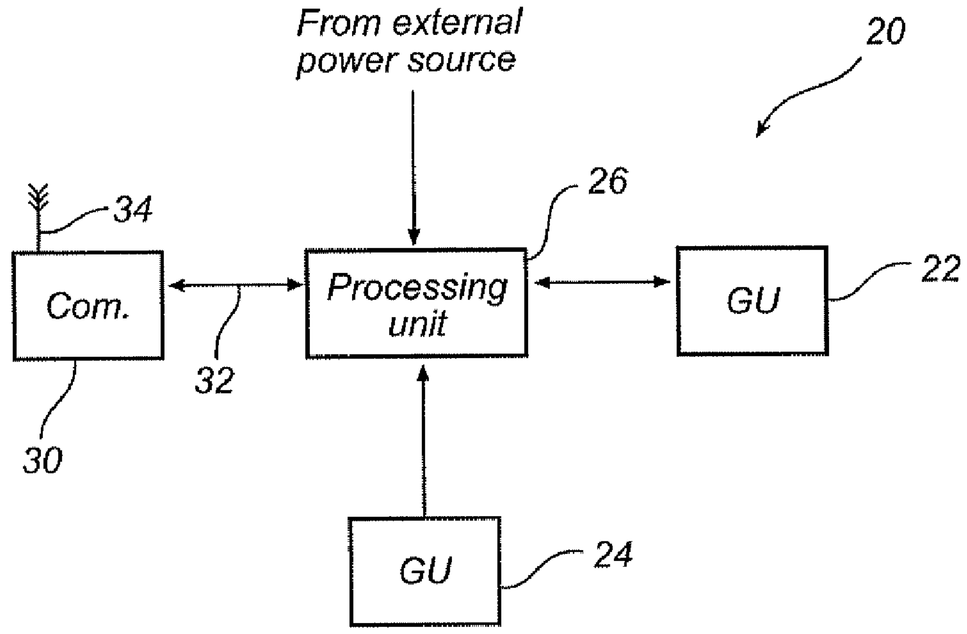
FIG. 2*a* and 2*b* are schematic block diagrams of two different gauging systems according to the invention.

With reference to FIG. 2*a*, a gauging system 20 according to the invention will now be described in relation to the measurement of a process variable. In the illustrated embodiment, the gauging system 20 comprises a first and a second gauge 22, 24, each configured to sense a different process variable. The gauging system 20 is however not limited to a specific number of gauges, but can comprise for example only a single gauge or a plurality of gauges. The gauges 22, 24 may be selected from a non limiting group comprising a microwave-based level gauge, a temperature gauge, a Coriolis flow meter that measures how much fluid is flowing through a tube by determining the amount of flowing mass, or any other transducer which is configured to generate an output signal based on a physical input or that generates a physical output based on an input signal.

Typically, a transducer transforms an input into an output having a different form. Types of transducers include various analytical equipment, pressure sensors, thermistors, thermocouples, strain gauges, flow transmitters, positioners, actuators, solenoids, indicator lights, and others. Furthermore, a gauge may be either active, passive, or a combination of the two, that is a gauge can be configured to solely transmit information (e.g. a temperature sensor), to solely receive information (e.g. a valve), or a combination of receiving and transmitting information (e.g. a radar level gauge).

The gauging system 20 further comprises a processing unit 26 configured to receive process variables provided by each of the gauges 22, 24. The processing unit 26 may also be configured to control each of the gauges 22, 24, for example by providing control commands to the gauges 22, 24. The processing unit 26 is further configured to receive power from a remote external power source. The remote external power source may be provided by means of a power source already available in close surrounding of the gauging system 20, such as for example a power source for powering ambient lighting in an area in the surrounding of the gauging system, e.g. a 230 Volt power source, a main line in a plant, a power grid, or similar. It would also be possible to use a remote external power source delivering less than 230 Volt, such as for example from approximately 12 Volts and above. For example, in some installations, the gauge 22/24 may require more power than what is practically available using a battery, a solar cell, or by means of a two-wire control loop, and power is provided to the gauge from a remote external power source. That is, a two-wire control loop is not used solely for powering the gauging system 20. Generally, the external power source is not an intrinsically safe power source. However, power supply circuitry in the processing unit 26 performs adequate operations for regulating the power received from the remote external power source to arrange for the processing unit to become intrinsically safe. The processing circuitry of the processing unit may provide for galvanic separation between the incoming power from the remote external power source and the intrinsically safe regulated power provided as an output from the power supply circuitry. Furthermore, a cable 28 provides power and connects the external power source with the gauging system 20.

Intrinsically safe should here be understood to mean protected through an explosion protection method according to the current standard IEC 60079 11 or corresponding subsequent standards, which allows flammable atmosphere to come in contact with electrical equipment without introducing a potential hazard. The electrical energy available in intrinsically safe circuits is restricted to a level such that any spark or hot surfaces which occur as a result of electrical faults are too weak to cause ignition.

The gauging system 20 also comprises a wireless communication unit 30, in one embodiment adapted for bi-directional communication with the host computer 7 in FIG. 1. The wireless communication unit 30 is connected to the processing unit 26 over an intrinsically safe interface 32, for example arranged in accordance to the digital HART protocol or any other suitable communication protocol. The interface 32 provides both power to the wireless communication unit 30, as well as an information path between the wireless communication unit 30 and the processing unit 26. According to the invention, the communication between the wireless communication unit 30 and the processing unit 26, preferably bi-directional, is provided by superimposing information, i.e. process data representative of process variable sensed by at least one of the gauges 22, 24, onto the interface 32. That is, superimposing of information on the interface 32 between the processing unit 26 and the wireless communication unit 30 may be provided by slightly adjusting a voltage level associated with the power provided to the wireless communication unit. Similarly, a current associated with the power provided to the wireless communication unit 30 may be adjusted, or by adjustment of the power itself provided to the wireless communication unit 30. Further possibilities exist, including for example superimposition of a high frequency signal onto the power provided to the wireless communication unit 30.

In an embodiment, an out-coupling unit of the processing unit 26, i.e. a part of the processing unit 26 that is the last device before the physical interface 32 connecting the processing unit 26 and the wireless communication unit 30, is a digital HART communication modem configured to power the wireless communication unit 30, to provide the wireless communication unit 30 with process data, and to receive control information from the wireless communication unit 30, e.g. received by RF circuitry comprised in the wireless communication unit 30. The digital HART communication modem can be configured to deliver at least 40 mW of power to the wireless communication unit 30 at a moment of activation of the wireless communication unit 30. Furthermore, it is possible to set, e.g. by programming the HART modem, the output level to always deliver as much as 20 mA (i.e. in an embodiment where the digital HART protocol is arranged as a two-wire control interface configured to deliver between 4-20 mA), which thereby generally will be enough for allowing activation of the wireless communication unit 30 at any given moment. The RF circuitry comprised in the wireless communication unit 30 may be connected to an antenna 34 for transmitting information to and for receiving information from for example the host computer 7, where the host computer 7 in turn comprises means for transmitting information to and for receiving information from the gauging system 20.

In the above description provided in relation to FIG. 2*a*, the gauging system 20 has been described in the context of separate modules, i.e. a gauging system 20 comprising a gauge 22/24, a processing unit 26 and a wireless communication unit 30. However, FIG. 2*b* illustrates an alternative embodiment in which the gauge has an integrated processing unit.

Figure 2B:
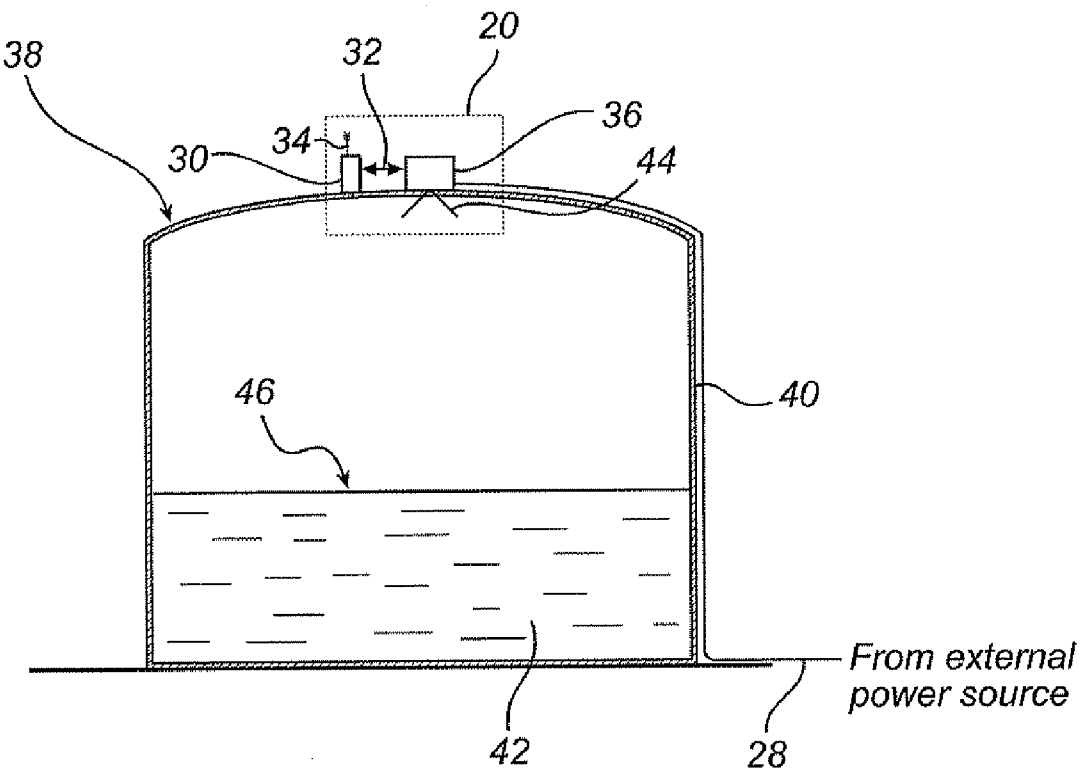

The combined gauging/processing unit illustrated in FIG. 2*b* is a microwave-based level gauging/processing unit 36 attached to the roof 38 of a container, such as a tank 40. The tank 40 is used for storing a product 42. The product may be such as oil, refined products, chemicals and liquid gas, or may be a material in powder form. A microwave beam is transmitted from the level gauging/processing unit 36 via an antenna 44 at the interior of the tank 40. The transmitted beam is reflected from the surface 46 of the product 42 and is received by the antenna 44. By means of a comparison and evaluating of the time lag between transmitted and reflected beam in a control unit, a determination of the level of the product surface 46 is performed in a known manner, e.g. by means of FMCW (Frequency Modulated Continuous Wave) or by means of repetitive microwave pulses.

However, the microwave may also be transmitted via a microwave transfer medium, such as a waveguide or a coaxial cable (not shown), which communicates with the product, e.g. by means of TDR (Time Domain Reflectometry).

The control unit of the level gauging/processing unit 36 may include a microprocessor, a microcontroller, a programmable digital signal processor or another programmable device. The control unit may also, or instead, include an application specific integrated circuit (ASIC), a programmable gate array programmable array logic, a programmable logic device, or a digital signal processor. Where the control unit includes a programmable device such as the microprocessor or microcontroller mentioned above, the processor may further include computer executable code that controls operation of the programmable device.

Similarly to the embodiment described in relation to FIG. 2*a*, the gauging system 20 illustrated in FIG. 2*b* receives power from a high power source located in close surrounding of the gauging system 20.

Figure 3:
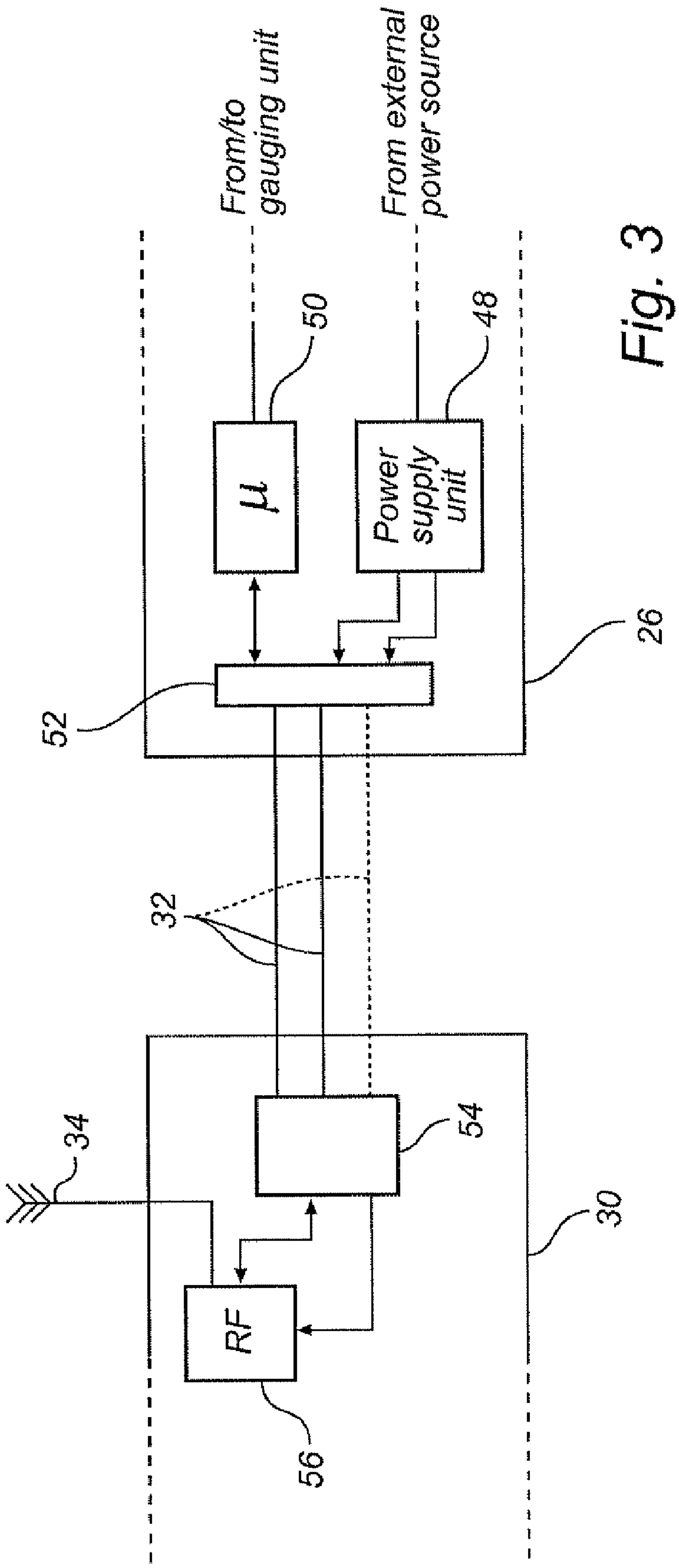
FIG. 3 is a detailed schematic block diagram of the connection between a processing unit and a wireless communication unit comprised in a gauging system.

FIG. 3 illustrates a detailed schematic block diagram of the connection between the processing unit 26 and the wireless communication unit 30. As discussed above in relation to FIG. 2*a*, the processing unit 26 comprises a power supply unit 48 and a control unit 50, as well as in an embodiment a digital HART modem 52. During operation, and as briefly discussed above, the control unit 50 receives a sensed process variable that is processed into process data representative of the sensed process variable. Similarly, the power supply unit 48 receives power from the external power source, and adapts the power in accordance to IS regulations. In turn, power and process data from the power supply unit 48 and the control unit 50, respectively, are provided to the HART modem 52, where the process data is superimposed onto the power to be supplied to the wireless communication unit 30.

The intrinsically safe interface 32, e.g. a two-wire connection, connects the processing unit 26 with the wireless communication unit 30. In the wireless communication unit 30, another digital HART modem 54 receives the combined power and communication signal, and separates the process data from the power. In the illustrated embodiment two digital HART modems 52, 54 are used for the communication between the processing unit 26 and the wireless communication unit 30, and for the power supply of the wireless communication unit 30. However, other similar devices suitable for combining and dividing power and information signals are possible and within the scope of the invention. In an alternative embodiment, the intrinsically safe interface 32 comprises three wires for simplifying the power supply of wireless communication unit 30 by means of the processing unit 26.

The outputs from the HART modem 54 of the communication device 26, i.e. a communication signal and power, are provided as separate signals to RF circuitry 56, which generates Radio Frequency (RF) signals that are transmitted using the antenna 34. As also discussed above, the RF circuitry 56 may also receive communication signals from an external unit, such as host computer 7, and in turn provide the received communication signals to the HART modem 54 of the wireless communication unit 30 where they are superimposed on the power received from the HART modem 52 of the processing unit 26. The received communication signals will in turn be separated by the HART modem 52 of the processing unit 26 and be provided to the control unit 50 for further processing. The RF circuitry 56 can be configured for digital communication using a digital modulation technique, or in accordance to more general analog communication protocols using analog modulation techniques. However, any communication protocol may be used, as desired, including IEEE 802.15.4, or other protocols, including proprietary communication protocols.

Figure 4:
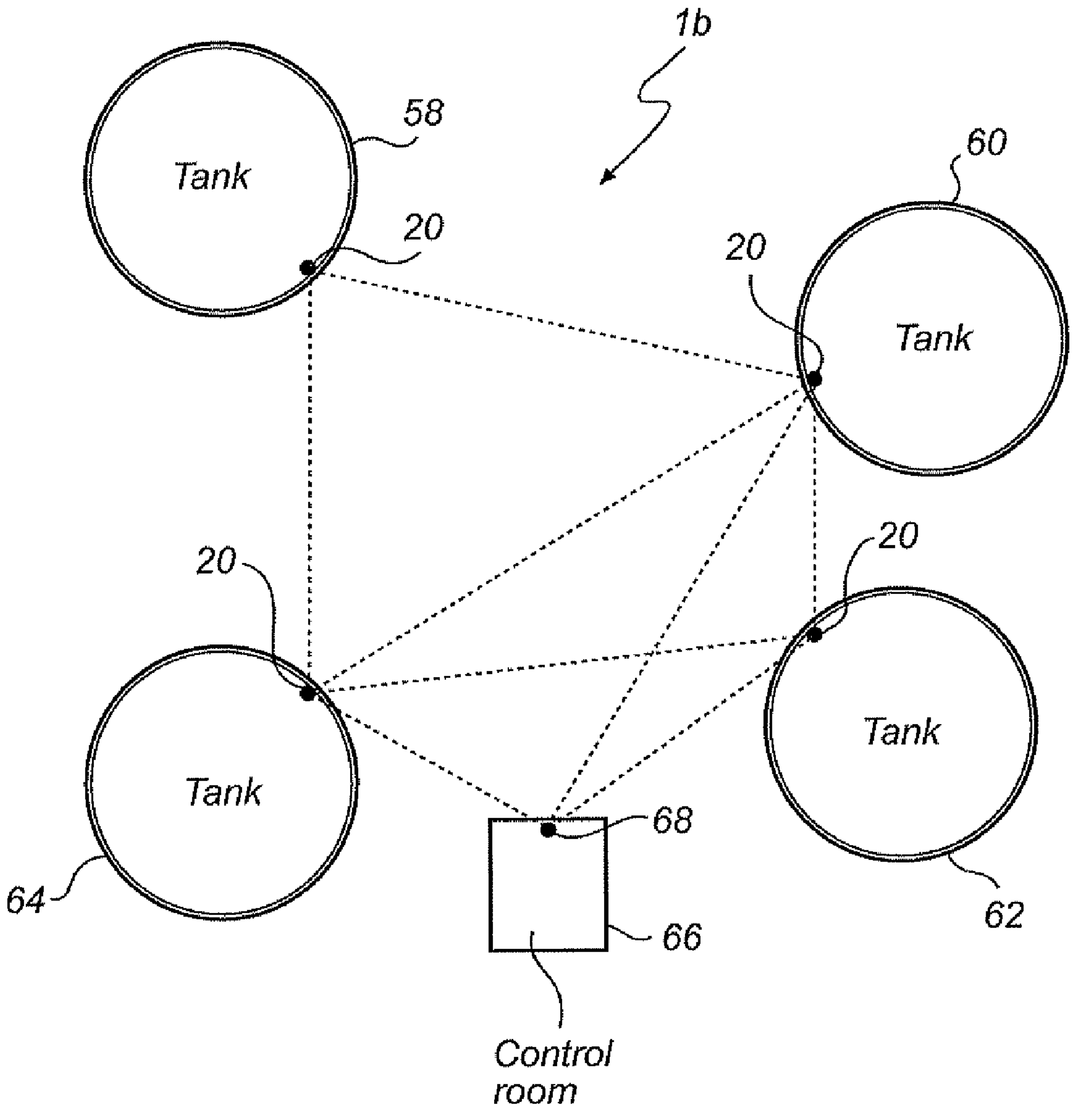
FIG. 4 schematically illustrates a mesh network in which a plurality of gauging systems are arranged to communicate.

Turning now to FIG. 4, which illustrates a top view of a tank farm 1*b*, comprising an implementation of the gauging system according to the invention. In comparison to the prior art tank farm 1*a* illustrated in FIG. 1, tanks 58, 60, 62 and 64 of the tank farm 1*b* are connected with each other by means of wireless communication. Accordingly, each of the tanks 58, 60, 62 and 64 have thereto arranged a gauging system 20 as discussed above, comprising the wireless communication unit 30 for allowing wireless communication between the tanks 58, 60, 62 and 64. The tank farm 1*b* comprises, similarly to the tank farm 1*a* in FIG. 1, a control room 66 comprising a host computer (not illustrated) for receiving communication signals, where the host computer is connected to a transceiver 68 for receiving and transmitting signals from and to the tanks 58, 60, 62 and 64. The communication paths between the tanks 58, 60, 62, 64 and the transceiver 68 are illustrated using dashed lines.

In the illustrated embodiment, the tanks 58, 60, 62 and 64 are configured as a self-organizing mesh network, where the self-organizing mesh network preferably is configured in accordance to a Time Synchronized Mesh Protocol (TSMP). TSMP provides redundancy and fail-over in time, frequency and space to ensure very high reliability even in the most challenging radio environments. TSMP also provides the intelligence required for self-organizing, self-healing mesh routing. Furthermore, as the network is self-organizing it can be extended as needed without sophisticated planning.

As understood by the skilled addressee, the practical wireless communication distance between two wireless communication units are limited due to allowable transmission effects, the present RF environment, etc. Therefore, in the illustrated embodiment, not all of the tanks 58, 60, 62 and 64 may communicate directly with the transceiver 68 of the control room 66. Accordingly, as an example, in case a distance between the wireless communication unit of the gauging system 20 arranged onto the tank 58 and the transceiver 68 of the control room 66 is to large in comparison to the possible wireless range, information to be transmitted between them will be relayed using the mesh protocol, e.g. relayed using the gauging system of the tank 60, the gauging system of the tank 64, a combination of the gauging systems of the tanks 60 and 62, or a combination of the gauging systems of the tanks 64 and 62, as is illustrated by means of the dashed lines illustrating possible communication paths.

In an alternative embodiment where the gauging system 20 comprises a plurality of gauges in connection to a respective plurality of wireless communication units, the self-organization allows for the a large plurality of communication paths and the ability to re-organize in a case where a communication path is broken. Also, through this ability, the tank gauging system according to the invention becomes useful in an even wider variety of application areas. An effect of the use of a self-organizing, self-healing mesh network thus introduces a redundancy in the communication paths between a gauging system and the control room, plus the possibility to reorganize the communication paths in case of broken communication paths due to changed conditions e.g. due to weather, new or unknown RF systems, moving equipment and population density.

Furthermore, a full mesh topology with automatic node joining and healing lets the network maintain long-term reliability and predictability in spite of these challenges. As with water flowing downhill, only self-organizing full mesh networks can find and utilize the most stable routes through the available node topology. Also, a fully redundant routing requires both spatial diversity (try a different route) and temporal diversity (try again later). Accordingly, TSMP covers spatial diversity by enabling each node to discover multiple possible parent nodes and then establish links with two or more. Preferably, temporal diversity is handled by retry and failover mechanisms.

Furthermore, the skilled addressee realizes that the present invention by no means is limited to the preferred embodiments described above. On the contrary, the skilled addressee understands that many modifications and variations are possible and within the scope of the appended claims For example, the transmission of Radio Frequency (RF) signals may comprise electro-magnetic transmissions of any frequency and is not limited to a particular group of frequencies, range of frequencies or any other limitation.

What is claimed is:

1. A gauging system, comprising:

a gauge configured to sense a process variable and to provide process data representative of the process variable;

a processing unit connected to the gauge, the processing unit comprising:

power supply circuitry configured to receive power from a remote external power source other than a two-wire control loop and to provide regulated power; and first circuitry configured to receive process data from the gauge and to superimpose the process data onto the regulated power forming a power signal; and a wireless communication unit electrically connected to the processing unit by means of a two-wire control interface, the wireless communication unit comprising:
second circuitry configured to receive the power signal and to separate the process data from the regulated power;
an antenna; and
radio frequency (RF) communication circuitry being powered by means of the regulated power from the second circuitry, configured to receive process data from the second circuitry, and to transmit RF signals representative of the process data using the antenna.

2. The gauging system of claim 1, wherein the regulated power is provided in an intrinsically safe manner.

3. The gauging system of claim 1, wherein the power signal is provided in an intrinsically safe manner.

4. The gauging system of claim 1, wherein the remote external power source is configured to deliver at least 100 Volts to the power supply circuitry.

5. The gauging system of claim 1, wherein the process data is digitally superimposed on the regulated power.

6. The gauging system of claim 1, wherein the first circuitry comprises a digital HART modem, powered by said power supply circuitry and programmed to provide an output current sufficient to power the wireless communication unit.

7. The gauging system of claim 1, wherein said output power is sufficient to activate said wireless communication unit at any given moment.

8. The gauging system of claim 1, wherein the power supply circuitry provides at least 40 mW by means of the power signal to the wireless communication unit at a moment of transmission of RF signals.

9. The gauging system of claim 1, wherein the wireless communication unit is configured in accordance to a self-organizing mesh network.

10. The gauging system of claim 9, wherein the self-organizing mesh network is configured according to a time synchronized mesh protocol (TSMP).

11. The gauging system of claim 1, wherein the RF circuitry is configured for digital communication.

12. The gauging system of claim 1, wherein the RF circuitry is configured for analog communication.

13. The gauging system of claim 1, wherein the electrical connection between the processing unit and the wireless communication unit comprises a third wire.

14. The gauging system of claim 1, wherein the gauge is a microwave-based level gauge configured to sense a level of a product in a tank through reflection of microwave energy.

15. The gauging system of claim 1, wherein the gauge is a temperature gaug configured to sense a temperature of a product in a tank.

16. The gauging system of claim 1, wherein the gauge is a Coriolis flow meter configured to sense a direct measurement of mass flow of a product.

17. The gauging system of claim 1, wherein the gauge and the processing unit are physically separated.

18. The gauging system of claim 1, wherein the gauge and the processing unit are physically combined.

19. A method for providing power to a wireless communication unit electrically connected to a processing unit by means of a two-wire control interface, wherein the method comprises:
receiving a sensed process variable from a gauge connected to the processing unit, thereby forming process data representative of the process variable;
providing regulated power based on power received from a remote external power source other than a two-wire control loop;
superimposing the process data onto the regulated power, thereby forming a power signal;
providing the power signal to the wireless communication unit,
separating the process data from the regulated power;
providing the regulated power to radio frequency (RF) communication circuitry comprised in the wireless communication unit;
providing the separated process data to the RF communication circuitry; and
transmitting RF signals representative of the process data by means of an antenna connected to the RF circuitry.

20. Method of claim 19, further comprising the step of providing the regulated power in an intrinsically safe manner.

21. A gauging system, comprising:
power supply circuitry configured to receive power from an external power source other than a two-wire control loop,
a gauge, powered by said power supply circuitry, and configured to sense a process variable and to provide process data representative of the process variable;
a two-wire control interface, and
a wireless communication unit,
wherein said two-wire control interface is used to power said wireless communication unit and to communicate said process data to said wireless communication unit.

22. The gauging system according to claim 21, wherein said two-wire control interface comprises a HART modern powered by said power supply circuitry and programmed to provide an output current sufficient to power the wireless communication unit.

23. The gauging system according to claim 21, wherein said output power is sufficient to activate said wireless communication unit at any given moment.

24. The gauging system of claim 21, wherein the remote external power source is configured to deliver at least 100 Volts to the power supply circuitry.

25. The gauging system of claim 21, wherein said two-wire control interface is connected only to said wireless communication unit.

26. The gauging system of claim 21, wherein the process data is digitally superimposed on a power signal.

27. The gauging system of claim 21, wherein the two-wire interface provides at least 40 mW power to the wireless communication unit at a moment of wireless transmission.

* * * * *